UNITED STATES PATENT OFFICE.

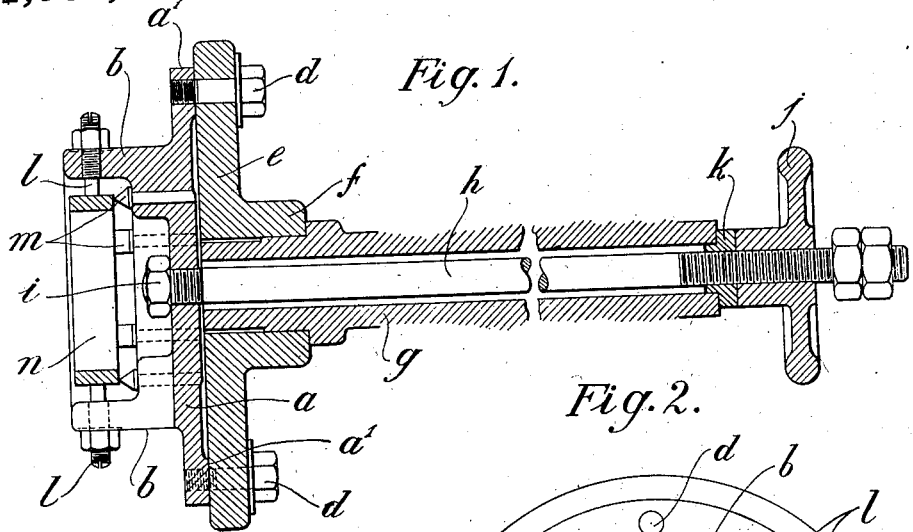
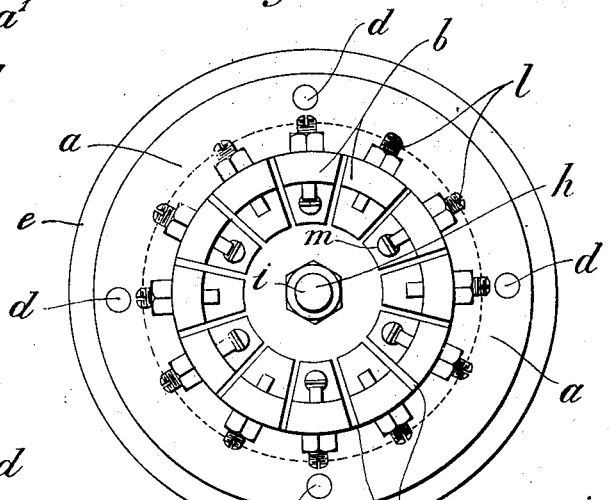
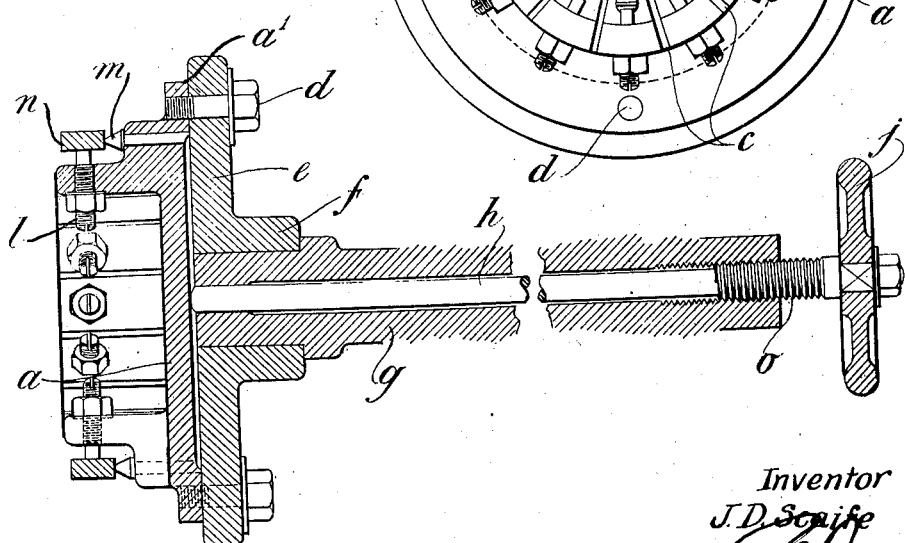

JOSEPH DYSON SCAIFE, OF NEWARK-ON-TRENT, ENGLAND.

CHUCK AND LIKE WORK-HOLDER.

1,389,272.  Specification of Letters Patent.  Patented Aug. 30, 1921.

Application filed November 6, 1919. Serial No. 336,035.

*To all whom it may concern:*

Be it known that I, JOSEPH DYSON SCAIFE, a subject of His Majesty the King of England, and resident of Newark-on-Trent, in the county of Nottingham, Kingdom of England, have invented certain new and useful Improvements in Chucks and like Work-Holders, of which the following is a specification.

This invention relates to improvements in chucks and like work holders for use in connection with machine tools and the like.

The object of the invention is to provide an improved method of centralizing and binding the work to be machined. This object is achieved by the springing or flexing of the base of the chuck, thus causing the jaws thereof to move in relation to the work. Preferably the jaws are positively operated to grip the work and spring back into their normal position when the base of the chuck is unsprung though this arrangement may be reversed if desired.

In order that the invention may be clearly understood and readily carried into effect, it is hereinafter described with reference to the accompanying drawings, in which:—

Figure 1 is a sectional side elevation of a chuck showing the same attached to the spindle of a grinding machine;

Fig. 2 is a front elevation of the chuck showing the jaws thereon; and

Fig. 3 is a detail view showing a modified arrangement for springing the chuck and actuating the jaws.

As shown and in carrying the invention into effect as applied to a chuck suitable for fixing to the spindle of an internal grinding machine the body of the chuck is made of metal and comprises a more or less flexible disk like base or flanged body portion $a$ carrying on its face a plurality of concentrically arranged lugs or jaws $b$ preferably formed, as illustrated, integrally with the base and divided from one another by means of radial saw cuts or slots $c$. The base portion $a$ of the chuck is relieved or thickened at $a'$ at or near its outer edge and is suitably secured as by bolts or other fastening devices $d$ to a second or rigid base member or carrier plate $e$ which is adapted to be fixed to the machine in any suitable manner as may be necessary for the purposes of machining. In the case of a grinding machine it could as in the present instance conveniently be formed with a central boss $f$ and be fixed to the end of the spindle $g$.

The disk or base $a$ of the chuck is tapped at its center to engage the end of an axial draw bolt $h$ which is secured thereto by means of a lock nut $i$. This bolt $h$ passes through the hollow spindle $g$ of the machine to the opposite end where it is screw threaded and provided with a hand operating wheel $j$ bearing on a thrust washer $k$ in the end of the said spindle $g$. In operation when this wheel is screwed up it operates the draw bolt $h$ and springs the disk like body or base $a$ of the chuck thus causing the lugs $b$ thereon forming the jaws of the chuck to move radially inward to hold the work in a concentric position. In each lug or jaw $b$ an adjustable binding screw $l$ is also preferably provided to engage the work $n$ as well also as a plurality of locating pins $m$ for the work to rest upon when in position.

In a slightly modified arrangement shown in Fig. 3 and designed for holding the work on the inside, as for externally grinding the ring $n$, the operating draw bolt $h$ may be screwed as at $o$ to engage the spindle $g$ so that when the wheel $j$ is rotated its end will push against the center or disk portion $a$ of the chuck and so cause the jaws $b$ to move radially outward. In such case the contact screw $l$ would be reversed as indicated and the locating pins $m$ arranged around the outside of the jaws. An alternative to this arrangement is to have the draw-bar as arranged for external gripping as in Fig. 1 and to contract the jaws by means of a pull on the bar. The actual gripping being performed by the jaws springing back to the normal position after releasing the pull on the draw-bar.

What I claim is:—

1. A chuck comprising a more or less flexible base thickened at its edge said edge being secured to a rigid plate, concentric jaws on said disk, binding screws and locating pins in connection with the said jaws and a hand operated bolt for springing the base and actuating the jaws.

2. A chuck including a base having a thickened marginal edge to be fixedly secured, work holding elements projecting from the base inwardly of the thickened edge, and means for flexing the base within the thickened edge to change the position of the free ends of the work holding elements.

3. A chuck comprising a support, a base having a thickened marginal edge adapted to be secured to said support at said edge, work holding elements projecting outwardly from the base, inwardly of said thickened edge and means operative from beyond the support for flexing the base to change the position of the free ends of the work holding elements.

4. A chuck comprising a support, a base having a thickened edge, means for securing said base to the support at the thickened edge of the base, work holding elements projecting outwardly from the base, means adjustably mounted in said elements to directly engage the work, and means for flexing the base inwardly of the thickened edge to change the position of the free ends of the work holding elements.

5. A chuck comprising a support, a disk having a thickened edge secured to said support at said thickened edge, work holding elements projecting outwardly from the base in spaced relation and disposed inwardly of the thickened edge, and a rod operative through the support and engaging the disk to flex the same inwardly of the work holding elements.

6. A chuck including a flat disk-like base, jaws on said base, and means for springing the central portion of said base relative to the edge thereof to actuate the jaws.

7. A chuck comprising an element secured at the edges and capable of being centrally flexed, jaws carried by the element and projecting at an angle to the flexing plane of the element, and means for flexing said element.

8. A chuck comprising a base-like element secured at the edges and capable of being centrally flexed, jaws carried by the element and projecting outwardly at an angle thereto with their free ends capable of movement relative to the axis of the element, in the flexing movement of the element, and means for flexing said element to induce movement of the free ends of the jaws.

In testimony whereof I have hereunto signed my name.

JOSEPH DYSON SCAIFE.

Witnesses:
T. B. MALLETT,
THOS. H. COOK.